US012716362B1

(12) United States Patent
Kim et al.

(10) Patent No.: US 12,716,362 B1
(45) Date of Patent: Aug. 25, 2026

(54) COVER PLATE FOR CMC COMPONENTS

(71) Applicant: RTX CORPORATION, Farmington, CT (US)

(72) Inventors: Russell Kim, Temecula, CA (US); Monty Harned, San Clemente, CA (US); David J Wasserman, Hamden, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/228,180

(22) Filed: Jun. 4, 2025

(51) Int. Cl.
*F01D 11/08* (2006.01)

(52) U.S. Cl.
CPC .......... *F01D 11/08* (2013.01); *F05D 2240/15* (2013.01); *F05D 2260/30* (2013.01); *F05D 2300/175* (2013.01); *F05D 2300/6033* (2013.01)

(58) Field of Classification Search
CPC .. F01D 11/08; F05D 2240/15; F05D 2260/30; F05D 2300/175; F05D 2300/6033
See application file for complete search history.

(56) References Cited

U.S. PATENT DOCUMENTS 8,784,037 B2 * 7/2014 Durocher ................ B22F 5/009 415/173.1
9,745,856 B2 8/2017 Uskert et al.
10,378,385 B2 * 8/2019 Tesson ...................... F01D 9/04
10,443,420 B2 10/2019 Sippel et al.
11,125,098 B2 * 9/2021 Barker ...................... F02C 7/28
11,248,482 B2 2/2022 Blaney et al.
11,326,463 B2 * 5/2022 Blaney .................. F01D 25/246
11,454,130 B2 9/2022 Barker et al.
12,110,797 B1 * 10/2024 Micucci .................. C04B 41/89
12,188,365 B1 * 1/2025 Thomas ................ F01D 25/246
2016/0319686 A1 * 11/2016 Shi ........................ F01D 11/005
2016/0319841 A1 * 11/2016 McCaffrey ............. F01D 25/12
2018/0363483 A1 * 12/2018 Hafner .................... F01D 11/08
(Continued)

FOREIGN PATENT DOCUMENTS

FR 3131597 A1 * 7/2023 ........... F01D 25/246
FR 3131598 A1 * 7/2023 .............. F01D 11/08

OTHER PUBLICATIONS

"Special Metals INCONEL® Alloy 625", ASM Aerospace Specification Metals Inc., "https://asm.matweb.com/search/SpecificMaterial.asp?bassnum=NINC33".*

*Primary Examiner* — Nathaniel E Wiehe
*Assistant Examiner* — Theodore C Ribadeneyra
(74) *Attorney, Agent, or Firm* — Millen, White, Zelano & Branigan, P.C.; Brion P. Heaney

(57) ABSTRACT

A conformable cover plate can be used to provide a barrier layer between ceramic matrix composite (CMC) components of jet engines and metallic ancillary hardware that is used, for example, to support the CMC components within the engine. The cover plate conforms to a structure feature of the CMC component that will be in close proximity to the ancillary hardware. By acting as a barrier layer, the conformable cover plate can reduce abrasion of the CMC material and/or prevent or ameliorate undesired chemical interactions between SiC-containing CMCs and Ni-based metals. Further, the conformable cover plate can act as a heat shield to lower heat transfer between CMC components and the ancillary hardware.

19 Claims, 3 Drawing Sheets

(56) References Cited

U.S. PATENT DOCUMENTS

| | | | | |
|---|---|---|---|---|
| 2020/0040751 | A1* | 2/2020 | Barker | F01D 11/005 |
| 2021/0071584 | A1* | 3/2021 | Barker | F01D 25/246 |
| 2021/0131300 | A1* | 5/2021 | Arbona | F01D 11/005 |
| 2022/0003126 | A1* | 1/2022 | Roy Thill | F01D 25/246 |
| 2022/0397041 | A1* | 12/2022 | Bisson | F01D 25/246 |

* cited by examiner

COVER PLATE FOR CMC COMPONENTS

FIELD OF THE INVENTION

The present disclosure relates generally to ceramic matrix composite (CMC) components. In particular, the present disclosure concerns cover plates for use with CMC components.

BACKGROUND OF THE INVENTION

Gas turbine engines, in general, include a fan section, a compressor section (e.g., a high-pressure compressor module and a low-pressure compressor module), a combustion section, and a turbine section (e.g., a high-pressure turbine module and a low-pressure turbine module). Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and drive the compressor and fan sections.

Certain components of turbine engines are thus exposed to the high-energy, high temperature gas flow (gaspath), i.e., flow path or gaspath components. Therefore, it is desirable that such components be made of materials with high heat resistance such as ceramic matrix composites (CMCs). Superalloys can also be used for manufacturing turbine engine components. However, since CMC materials can withstand much higher operating temperatures (e.g., greater than 1400° C.) than superalloys, CMC materials are desirably used for flow path components.

While CMC materials are used for jet engine components, metallic ancillary hardware can be used, for example, to support the CMC components within the engine casing. Interaction between CMC materials and metallic hardware can lead to issues such as but not limited to material compatibility, sealing, and thermal management. For example, direct contact between CMC materials and metallic ancillary hardware can lead to abrasion of the CMC materials and/or the ancillary hardware. Additionally, contact between SiC-containing CMC material and metals having high Ni content can result in a eutectic formation which in turn can lead to adverse effects.

Thus, there is a need to reduce or minimize harmful interactions between CMC components and metallic ancillary hardware.

SUMMARY OF THE INVENTION

In general, the present disclosure relates to reducing direct contact between CMC components and metallic ancillary hardware. In particular, the present disclosure relates to providing a barrier/protective layer between CMC components and metallic ancillary hardware.

The present disclosure is directed, in a first aspect, to an arrangement comprising:

- a ceramic matrix composite (CMC) component comprising a substrate containing ceramic fibers/fiber tows within a matrix, the substrate having an outer radial surface and a structural feature on the outer radial surface; and
- a conformable metal cover plate that conforms to at least a portion of the surface of the structural feature, wherein the conformable metal cover plate is made from a Ni-based or Co-based superalloy, and the conformable metal cover plate provides a barrier layer between the CMC component and metallic ancillary hardware.

The present disclosure is also directed, in a further aspect, to a method for reducing thermal, abrasive, and/or chemical interaction between a CMC component and ancillary hardware comprising:

- providing a ceramic matrix composite (CMC) component comprising a substrate containing ceramic fibers/fiber tows within a matrix, the substrate having an outer radial surface and a structural feature on the outer radial surface; and
- providing a conformable metal cover plate that conforms to at least a portion of the surface of the structural feature, wherein the conformable metal cover plate is made from a Ni-based or Co-based superalloy, and the conformable metal cover plate provides a barrier layer between the CMC component and ancillary hardware.

The present disclosure is further directed to a turbine engine comprising:

- a fan section, a compressor section, a combustion section, and a turbine section, the turbine section including at least one rotor and one or more turbine blade(s) extending radially outwardly from the at least one rotor;
- a ceramic matrix composite (CMC) component comprising a substrate containing ceramic fibers/fiber tows within a matrix, the substrate having an outer radial surface and a structural feature on the outer radial surface; and
- a conformable metal cover plate that conforms to at least a portion of the surface of the structural feature, wherein the conformable metal cover plate is made from a Ni-based or Co-based superalloy, and the conformable metal cover plate provides a barrier layer between the CMC component and ancillary hardware.

In further embodiments of the present disclosure, including further embodiments of the above exemplary embodiments, the CMC component comprises SiC fibers within a SiC matrix.

In further embodiments of the present disclosure, including further embodiments of the above exemplary embodiments, the conformable metal cover plate is made from Ni-based superalloy.

In further embodiments of the present disclosure, including further embodiments of the above exemplary embodiments, the conformable metal cover plate contains 50 wt. % Ni or more.

In further embodiments of the present disclosure, including further embodiments of the above exemplary embodiments, the conformable metal cover plate is made from a nickel-chromium-molybdenum alloy.

In further embodiments of the present disclosure, including further embodiments of the above exemplary embodiments, the conformable metal cover plate is made from Co-based superalloy.

In further embodiments of the present disclosure, including further embodiments of the above exemplary embodiments, the conformable metal cover plate is made from a cobalt-nickel-chromium-tungsten alloy.

In further embodiments of the present disclosure, including further embodiments of the above exemplary embodiments, the conformable metal cover plate contains 35 wt. % Co or more.

In further embodiments of the present disclosure, including further embodiments of the above exemplary embodiments, the conformable metal cover plate contains 35-70 wt. % Co.

In further embodiments of the present disclosure, including further embodiments of the above exemplary embodiments, the conformable metal cover plate contains less than 25 wt. % Ni.

In further embodiments of the present disclosure, including further embodiments of the above exemplary embodiments, the conformable metal cover plate is made from a superalloy selected from AMS 5666, INCONEL® 625, AMS 5662, AMS 5704, AMS 5706, AMS 5542, AMS 5598, AMS 5759, Haynes 188, and Haynes 25.

In further embodiments of the present disclosure, including further embodiments of the above exemplary embodiments, the structural feature interacts with the conformable metal cover plate to hold the conformable metal cover plate in position and prevent rotation of the conformable metal cover plate.

In further embodiments of the present disclosure, including further embodiments of the above exemplary embodiments, the conformable metal cover plate acts as a heat shield between the CMC component and the metallic ancillary hardware by reducing heat transfer.

In further embodiments of the present disclosure, including further embodiments of the above exemplary embodiments, the structural feature is a flange that is attached to metallic ancillary hardware for supporting the CMC component, and the conformable metal cover plate conforms to the flange and acts as a barrier between the flange and the metallic supporting ancillary hardware.

In further embodiments of the present disclosure, including further embodiments of the above exemplary embodiments, the CMC component is a gas turbine engine component selected from a blade outer air seal or segment thereof, a combustion liner or segment thereof, a vane, a vane platform, a support ring or disk, and exhaust nozzle flaps and seals.

In further embodiments of the present disclosure, including further embodiments of the above exemplary embodiments, the conformable metal cover plate is held in compressive engagement between the structural feature and the ancillary hardware.

In further embodiments of the present disclosure, including further embodiments of the above exemplary embodiments, the conformable metal cover plate is held in position by a portion of a tab of the CMC component extending into a recess of the conformable metal cover plate or through a hole in the conformable metal cover plate, or by a portion of the conformable metal cover plate extending into a slot or hole in the CMC component.

In further embodiments of the present disclosure, including further embodiments of the above exemplary embodiments, the CMC component has a cooling cavity with an opening at the radial outer surface and the conformable metal cover plate covers the cooling cavity opening.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
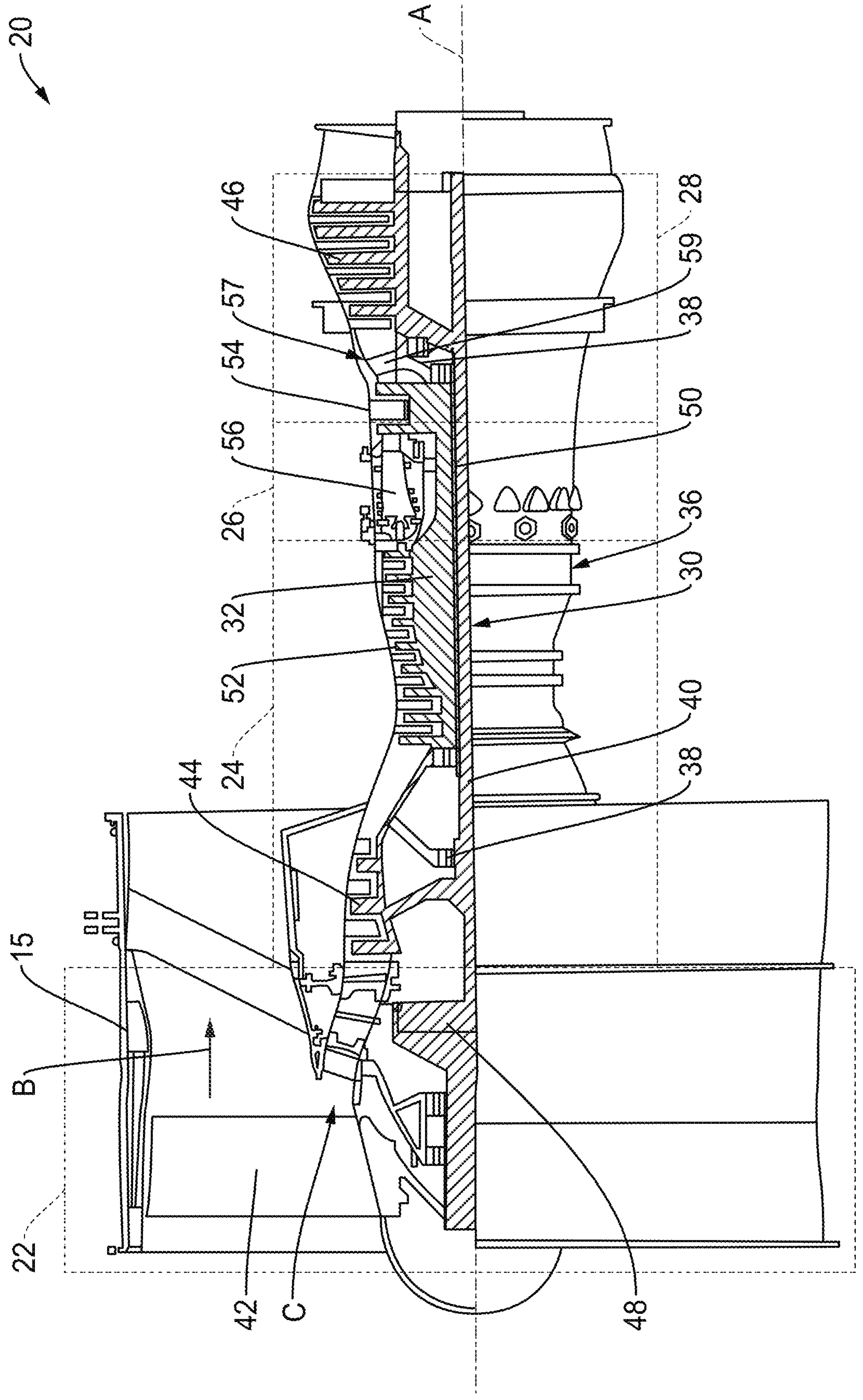
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total volume of the composition unless otherwise indicated.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

The present disclosure provides a means for reducing or preventing undesirable interaction between a CMC component and metallic hardware such as abrasive interactions, undesired chemical interactions, and/or excessive heat transfer. In particular, the present disclosure relates to conformable cover plates for providing a barrier/protective layer between CMC components and metallic hardware.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces in the direction toward the flow of the hot gases, i.e., faces upstream. The trailing edge/portion of a structure is the edge/portion that faces in the direction away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofan engines and may be applied to other types of turbine engines.

Engine 20 generally includes a low-speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low-speed spool 30 generally includes an inner shaft 40 that interconnects a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low-speed spool 30. High-speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low-speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

As noted above, gas turbine engine components can be made from CMC materials. Such components include blade outer air seal(s) (BOAS(s)), BOAS segments, other seals, vane airfoils and platforms therefor, combustor liners or segments thereof, support rings or disks, and exhaust nozzle flaps and seals.

In general, these CMC components are prepared by first creating a CMC preform which serves as the initial framework for creating the CMC component. The preform contains a stack of fabric sheets or plies in which the stack is formed via a layup process. The plies are made from ceramic fibers, or bundles of ceramic fibers called tows, held together with a binder. The fiber tows can be in the form of unidirectional tows, braided tows, or woven fibers. For example, the fibers can be woven into a two-dimensional fabric sheet or ply and then the plies are stacked during the layup process to form the preform. Alternatively, the preform can be in the form of a three-dimensional weave wherein, for example, a plurality of warp fibers are interwoven through a plurality of weft fiber layers. Binders can be used to help hold the fibers/plies together to provide a certain rigidity to the preform, for example, polymeric binders such as polyvinyl alcohol (PVA) or polyvinyl butyral (PVB).

The fibers/filaments used in the CMC preforms may be, for example, silicon carbide (SiC), carbon, mullite, zirconium carbide (ZrC), hafnium carbide (HfC), silicon nitride, aluminum oxide, or combinations thereof. The ceramic fibers may also be oxycarbide-, oxynitride-, carbonitride-, silicate-, boride-, phosphide-, or oxide-based fibers. In still further examples, the fibers are fully crystalline, partially crystalline, or predominantly amorphous or glassy. In one particular example, the fibers are SiC fibers.

The fibers of the preform can, optionally, be provided with one or several interphases deposited prior to introduction of a matrix material into the preform. This interphase coating can be, for example, a coating of boron nitride, silicon-doped boron nitride, boron-doped carbon, boron carbide, titanium nitride, or zirconium nitride which is applied by chemical vapor infiltration (CVI). The interphase coating(s) is used to prevent crack formation and/or propagation.

After the CMC preform is formed by the layup, the preform is subjected to densification to add matrix material to fill the remaining void spaces within the preform. This procedure stiffens and strengthens the fiber layers or woven plies of ceramic fiber tows to form the CMC. Thus, densification involves reducing the porosity within the preform, making it more solid and robust, by filling the remaining pores within the preform. The goal is to achieve a higher relative density, and ensure that the final CMC structure is compact and free of large voids. In one particular example, the CMC material contains SiC fibers within a SiC matrix, also referred to as a SiC/SiC composite.

Various methods can be used to add matrix material during densification. These include, but are not limited to, chemical vapor infiltration (CVI), reactive melt infiltration (RMI) (such as liquid silicon infiltration (LSI)), and polymer infiltration and pyrolysis (PIP).

As mentioned above, direct contact between CMC components and metallic hardware can result in damage to either the CMC component or the metallic hardware such as abrasion, thereby reducing the operation lifespan of these components. Additionally, excessive heat transfer between flow path CMC components and metallic hardware can lead to thermal stress in the metallic hardware. Further, contact between SiC-containing CMC material and metals having high Ni content can result in a eutectic formation which in turn can lead to material transfer and undesired fusing/bonding occurring between the CMC components and metallic hardware which can negatively impact the fit, structure and/or function of the CMC component.

In accordance with the present disclosure, a conformable cover plate is positioned between the CMC component and the metallic ancillary hardware. The conformable cover plate conforms to a structural feature of the CMC component such as a flange. This aids in holding the conformable cover plate in place. The conformable cover plate covers a region of the CMC component that is adjacent to metallic ancillary hardware such as hardware used to support the CMC component in the engine casing. Thus, conformable cover plate acts as a barrier/protective layer preventing direct contact between the CMC component and the adjacent metallic ancillary hardware.

The conformable cover plate can be made from a Ni-based superalloy. Such Ni-based superalloys can contain 50 wt. % Ni or more, for example, 50-70 wt. % Ni. For example, suitable Ni-based superalloys include Ni, Cr and Mo (nickel-chromium-molybdenum alloy) such as AMS 5666, INCONEL® 625, AMS 5662, AMS 5704, AMS 5706, and INCONEL® X-750 (AMS 5542 and AMS 5598).

The conformable cover plate can be made from a Co-based superalloy. Such Co-based superalloys can contain 35 wt. % Co or more, for example, 35-70 wt. % Co. For example, suitable Ni-based superalloys Co, Cr, Ni, and W (cobalt-nickel-chromium-tungsten alloy) such as AMS 5759, Haynes 188, and Haynes 25. Such cobalt-nickel-chromium-tungsten alloys can contain Ni in amounts of, for example, less than 25 wt. % Ni.

The metal conformable cover plate can be formed from a sheet by typical metal forming techniques. These include, but are not limited to, turning, milling, grinding, and/or lathing.

As noted above, the conformable cover plate conforms to a structural feature of the CMC component to aid in holding the plate in position. For example, when the structural feature is a flange and both faces of the flange are adjacent to ancillary metal hardware, the conformable cover plate can cover all or the portion of one face of the flange that is adjacent to ancillary hardware, wrap around the top of the flange, and then cover all or the portion of the other face of the flange that is adjacent to ancillary hardware. Alternatively, if only one face of the flange is adjacent to ancillary hardware, the conformable cover plate can cover all or the portion of the face of the flange that is adjacent to ancillary hardware, and then hook over the top or wrapped around the sides of the flange.

Further means can be used to limit/prevent movement of the conformable cover plate during operation. For example, the conformable cover plate can be held in compressive engagement between the structural feature of the CMC component and the ancillary hardware, for example, when a flange of the CMC component is positioned within a slot of ancillary hardware. Another alternative is to have an edge or edge portion of the conformable cover plate inserted into a slot of the CMC component. Further, the CMC component can have one or more protrusions (e.g., tabs or pins) that each extend into a recess within the conformable cover plate or each passes through a hole in the conformable cover plate.

To facilitate the positioning and fit of the conformable cover plate to the CMC component, the surface of the structural feature can be machined. Such machining can also improve the sealing of the conformable cover plate to the CMC component.

Figure 2:
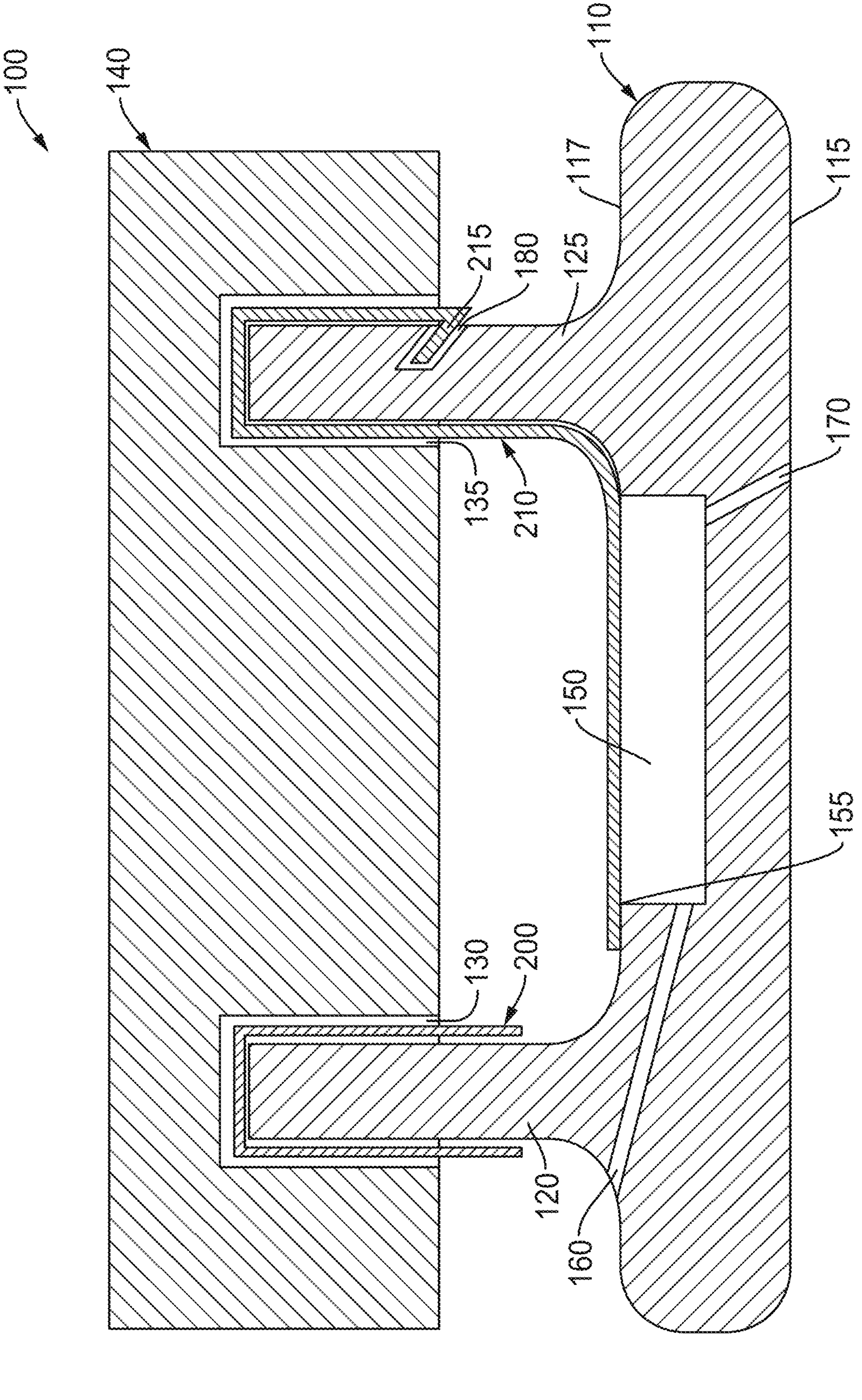
FIG. 2 schematically illustrates a cross section of a CMC component provided with an embodiment of a conformable cover plate.

FIG. 2 illustrates a cross section of a CMC component 100 (e.g., a BOAS segment) having a base substrate 110 with a radial inner surface 115 and a radial outer surface 117. Two structural features, i.e., flanges 120 and 125, extend radially outward from the radial outer surface 117. Each of these flanges are positioned within slots 130 and 135, respectively, in ancillary hardware 140. The ancillary hardware 140 is made of metal, for example, a Ni-based alloy.

The substrate 110 also has a cooling cavity 150 having a cooling cavity opening 155 at the radial outer surface 117. Additionally, the substrate 110 has a least one cooling air inlet 160 which permits cooling air from above the radial outer surface 117 to flow into the cooling cavity 150. Further, the substrate 110 has a least one cooling air outlet 170 which permits cooling air to be discharged from the cooling cavity 150.

In the embodiment of FIG. 2, flange 120 is provided with a conformable cover plate 200. Cover plate 200 conforms to the surface of flange 120 in the region where flange 120 is adjacent to the ancillary hardware 140, in this case the surface of flange 120 that is positioned within slot 130. In addition, flange 125 is provided with a conformable cover plate 210. As with cover plate 200, the conformable cover plate 210 conforms to the surface of flange 125 in the region where flange 125 is adjacent to the ancillary hardware 140, i.e., the surface of flange 125 that is positioned within slot 135.

Cover plate 200 can be held in position by compressive engagement between flange 120 and slot 130 of ancillary hardware 140. Such compressive engagement can prevent undesired movement of cover plate 200, e.g., sliding or rotation. Another manner of preventing undesired movement is shown with cover plate 210. Flange 125 includes a slot 180 into which an edge region 215 of cover plate 210 is inserted. It should be noted that the slot 180 can be a continuous slot through all or part of the width of the flange in the circumferential direction or can be a plurality of slots 180 located at specific locations along the width of the flange such that tabs at the edge region of cover plate 210 are inserted into the plurality of slots 180.

In the embodiment of FIG. 2, conformable cover plate 210 also provides a sealing barrier. Cover plate 210 covers cooling cavity opening 155 of cooling cavity 150, thereby separating cooling air flow with cavity 150 from cooling air flow above the radial outer surface 117.

Figure 3:
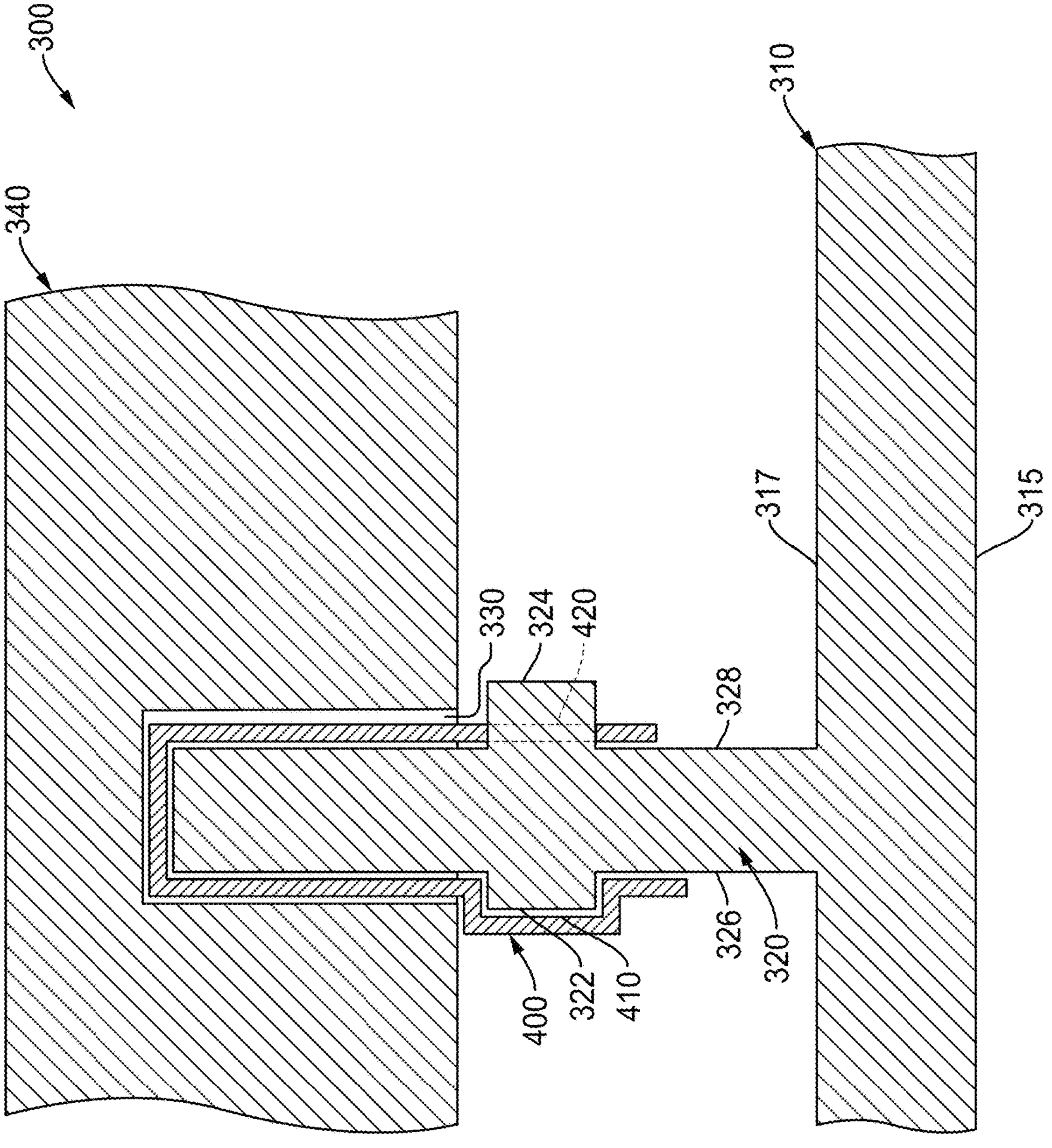
FIG. 3 schematically illustrates a cross section of a CMC component provided with another embodiment of a conformable cover plate.

FIG. 3 illustrates other arrangements for preventing undesired movement of the conformable cover plates. In this embodiment, the CMC component 300 has a substrate 310 with a radial inner surface 315 and a radial outer surface 317. Flange 320 extends radially outward from the radial outer surface 317. Flange 320 is positioned within slot 330 in ancillary hardware 340. The ancillary hardware 340 is made of metal, for example, a Ni-based alloy.

In the embodiment of FIG. 3, flange 320 is provided with a conformable cover plate 400. Conformable cover plate 400 conforms to the surface of flange 320 in the region where flange 320 is adjacent to the ancillary hardware 340, i.e., the surface of flange 320 that is positioned within slot 330. To prevent undesired movement of the cover plate 400, the cover plate 400 is provided with means for interacting with tabs 322 and 324 on flange 320. Tab 322 extends in a forward axial direction from forward facing surface 326 of flange 320 and tab or pin 324 extends in an aft axial direction from aft facing surface 328 of flange 320. Cover plate 400 includes a recess 410 into which tab 322 extends to thereby prevent undesired movement. On the other hand, cover plate 400 also includes a hole 420 through which a tab or pin 324 extends, also to prevent undesired movement.

The present disclosure provides an effective and efficient means for preventing undesired interactions between CMC components and metallic ancillary hardware. The conformable cover plate provides a barrier/protective layer between the CMC component and the metallic ancillary hardware to reduce abrasion of the CMC material and/or prevent or ameliorate undesired chemical interaction between SiC-containing CMCs and Ni-based metals. Further, the conformable cover plate can act as a heat shield to lower heat transfer between CMC and the ancillary hardware.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. An arrangement comprising:

a ceramic matrix composite (CMC) component comprising a substrate containing ceramic fibers/fiber tows within a matrix, the substrate having an outer radial surface and a structural feature on the outer radial surface; and a conformable metal cover plate that conforms to at least a portion of the surface of the structural feature, wherein the conformable metal cover plate is made from a Ni-based or Co-based superalloy, and the conformable metal cover plate provides a barrier layer between the CMC component and metallic ancillary hardware, wherein the structural feature is a flange and the conformable metal cover plate conforms to the flange and acts as a barrier between the flange and the metallic supporting ancillary hardware, wherein the flange has a slot or hole into which a portion of the conformable metal cover plate extends, and wherein the conformable metal cover plate is held in compressive engagement between the structural feature and the ancillary hardware.

2. An arrangement according to claim 1, wherein the CMC component comprises SiC fibers within a SiC matrix.

3. An arrangement according to claim 1, wherein the conformable metal cover plate is made from a Ni-based superalloy.

4. An arrangement according to claim 3, wherein the conformable metal cover plate contains 50 wt. % Ni or more.

5. An arrangement according to claim 3, wherein the conformable metal cover plate is made from a nickel-chromium-molybdenum alloy.

6. An arrangement according to claim 1, wherein the conformable metal cover plate is made from a Co-based superalloy.

7. An arrangement according to claim 6, wherein the conformable metal cover plate is made from a cobalt-nickel-chromium-tungsten alloy.

8. An arrangement according to claim 6, wherein the conformable metal cover plate contains 35 wt. % Co or more.

9. An arrangement according to claim 6, wherein the conformable metal cover plate contains 35-70 wt. % Co.

10. An arrangement according to claim 6, wherein the conformable metal cover plate contains less than 25 wt. % Ni.

11. An arrangement according to claim 1, wherein the conformable metal cover plate is made from a superalloy selected from AMS 5666, INCONEL® 625, AMS 5662, AMS 5704, AMS 5706, AMS 5542, AMS 5598, AMS 5759, Haynes 188, and Haynes 25.

12. An arrangement according to claim 1, wherein the structural feature interacts with the conformable metal cover plate to hold the conformable metal cover plate in position and prevent rotation of the conformable metal cover plate.

13. An arrangement according to claim 1, wherein the conformable metal cover plate acts as a heat shield between the CMC component and the metallic ancillary hardware by reducing heat transfer.

14. An arrangement according to claim 1, wherein the flange attached to metallic ancillary hardware for supporting the CMC component.

15. An arrangement according to claim 1, wherein the CMC component is a blade outer air seal or segment thereof.

16. An arrangement according to claim 1, wherein the CMC component is a gas turbine engine component selected from a blade outer air seal or segment thereof, a combustion liner or segment thereof, a vane, a vane platform, a support ring or disk, and exhaust nozzle flaps and seals.

17. An arrangement according to claim 1, wherein the flange has a slot into which an edge region of the conformable metal cover plate is inserted.

18. A method of reducing thermal, abrasive, and/or chemical interaction between a CMC component and ancillary hardware comprising:

providing a ceramic matrix composite (CMC) component comprising a substrate containing ceramic fibers/fiber tows within a matrix, the substrate having an outer radial surface and a structural feature on the outer radial surface; and providing a conformable metal cover plate that conforms to at least a portion of the surface of the structural feature, wherein the conformable metal cover plate is made from a Ni-based or Co-based superalloy, and the conformable metal cover plate provides a barrier layer between the CMC component and ancillary hardware, wherein the structural feature is a flange and the conformable metal cover plate conforms to the flange and acts as a barrier between the flange and the metallic supporting ancillary hardware, wherein the flange has a slot or hole into which a portion of the conformable metal cover plate extends, and wherein the conformable metal cover plate is held in compressive engagement between the structural feature and the ancillary hardware.

19. A turbine engine comprising:

a fan section, a compressor section, a combustion section, and a turbine section, the turbine section including at least one rotor and one or more turbine blade(s) extending radially outwardly from the at least one rotor;

a ceramic matrix composite (CMC) component comprising a substrate containing ceramic fibers/fiber tows within a matrix, the substrate having an outer radial surface and a structural feature on the outer radial surface; and a conformable metal cover plate that conforms to at least a portion of the surface of the structural feature, wherein the conformable metal cover plate is made from a Ni-based or Co-based superalloy, and the conformable metal cover plate provides a barrier layer between the CMC component and ancillary hardware, wherein the structural feature is a flange and the conformable metal cover plate conforms to the flange and acts as a barrier between the flange and the metallic supporting ancillary hardware, wherein the flange has a slot or hole into which a portion of the conformable metal cover plate extends, and wherein the conformable metal cover plate is held in compressive engagement between the structural feature and the ancillary hardware.

* * * * *